(12) United States Patent
Claringburn et al.

(10) Patent No.: US 8,204,379 B2
(45) Date of Patent: *Jun. 19, 2012

(54) NOISE REDUCTION IN OPTICAL COMMUNICATIONS NETWORKS

(75) Inventors: Harry Richard Claringburn, Nottingham (GB); Michael Sharratt, Nottingham (GB)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/948,185

(22) Filed: Nov. 17, 2010

(65) Prior Publication Data

US 2011/0064412 A1 Mar. 17, 2011

Related U.S. Application Data

(63) Continuation of application No. 10/500,905, filed on Jan. 31, 2005, now Pat. No. 7,860,396.

(30) Foreign Application Priority Data

Jan. 4, 2002 (GB) .................................. 0200177.4

(51) Int. Cl.
*H04J 14/02* (2006.01)

(52) U.S. Cl. ............. 398/83; 398/82; 398/97; 359/337.1
(58) Field of Classification Search ................. 398/48, 398/58, 59, 82, 83, 97, 174, 175; 359/337.1; 385/16

See application file for complete search history.

(56) References Cited

U.S. PATENT DOCUMENTS

| | | | | |
|---|---|---|---|---|
| 5,436,921 A | * | 7/1995 | Corio | 372/26 |
| 6,400,498 B1 | * | 6/2002 | Shimomura et al. | 359/341.1 |
| 7,860,396 B2 | * | 12/2010 | Claringburn et al. | 398/83 |
| 2003/0002104 A1 | * | 1/2003 | Caroli et al. | 359/127 |

* cited by examiner

*Primary Examiner* — Li Liu
(74) *Attorney, Agent, or Firm* — Kirschstein, et al.

(57) ABSTRACT

An optical network node for an n-channel dense wavelength division multiplexing (DWDM) optical communications network, includes an add path for adding an n-channel wavelength multiplex onto the network. The add path has an n-channel signal combiner for combining the n signal channels. An optical amplifier amplifies an output of the signal combiner. A multichannel wavelength selective filter with variable-per-channel attenuation filters out noise from the amplifier on a channel which carries no content to be added to the network, and controls amplitude of signals in channels to be added to the network. An add coupler couples the add path to the network.

10 Claims, 3 Drawing Sheets

NOISE REDUCTION IN OPTICAL COMMUNICATIONS NETWORKS

CROSS REFERENCE TO RELATED APPLICATION

This application is a continuation of U.S. patent application Ser. No. 10/500,905, filed Jan. 31, 2005, now allowed. This invention relates to the reduction of noise in optical communications networks, and in particular, to the reduction of noise in an add path where signals are placed onto the network at a network node.

Add/Drop multiplexers are widely used in optical communications networks to provide wavelength non-specific add/drop ports. This allows random transponder provisioning and tuneability. FIG. 1 shows an example of how add/drop multiplexers are used. The optical network is a dual fibre DWDM optical network with one fibre 10 carrying traffic in an East/West direction and the other fibre 12 in a West/East direction. The terms East and West are conveniently used to describe the direction in which network traffic travels and does not correspond to geographical East or West. The traffic is a multiplex, typically, of 32 wavelength channels. At network nodes, traffic is taken off the network and split into the component channels using an optical demultiplexer or a splitter and band pass filter and added into the network using an optical multiplexer and an add coupler.

The network nodes can add or drop traffic to either of the network fibres. It is desirable to route traffic the shortest distance around the network which will depend on the location of the destination node. It is also desirable to have a fall back path should one of the E/W or W/E paths fail.

Thus, in FIG. 1, each of the E/W and W/E network fibres comprise an amplification stage 14. This is a EDFA amplifier although this may be omitted in shorter networks. The applied signal is split in a 2:1 coupler 16 to provide two signal output paths. A through path 18 carries traffic that remains on the network and a drop path 20 drops the signal multiplex from the network for processing at the network node.

Each of the two dropped paths are input to an optical demultiplexer 22 which splits the signal into its constituent wavelength components. The receive transponder includes a switch 24 to select the signal output from one of the two demultiplexers. In practice in a 32 channel node, this switch will receive 32 channels from each of the demultiplexers.

Signals remaining on the through path pass through a channel control unit 26 and then to an add coupler 28 in which signals from the transmit side of the node transponder are added onto the network. The output of the add coupler is finally amplified again at 30 if required.

The add side of the transponder comprises an amplifier 32 and an n:1 add coupler 34, where n is the number of wavelengths in the multiplex carried by the network. The add coupler is required to add the individual wavelength signals that are to be placed onto the network. Use of add couplers has the disadvantage of incurring losses and causing the add power level to require amplification. Thus, the add signal is amplified. This in turn causes broadband noise which passes into the system degrading the OSNR (optical signal to noise ratio) of the added signals as well as those signals passing through the photonic add/drop node. It is known to add tuneable filters 36 following the add amplifier to remove the noise added to the through channels.

In the figure, the add coupler is shown as a multiplexer 34. Separate multiplexers may be used on the east and west paths.

The noise that is generated is dependant on the gain of the amplifier in the add path. This gain is determined by the maximum possible losses in the add path. When a signal is added, the source powers are adjusted on a per channel basis to achieve the required power at the point of addition. The signal to noise ratio is therefore worst when the loss of the add path is less than the maximum loss possible. The OSNR is optimised when the path loss is a maximum as the noise from the EDFA amplifier experiences the maximum loss.

This situation is undesirable and the present invention seeks to overcome by improving or optimising the add channel OSNR.

In its broadest form the invention overcomes the problem by filtering out the EDFA noise on signal paths which have no add content and controlling the signal amplitude of the added signals after amplification.

More specifically, there is provided an optical network node for an n channel DWDM optical network, the node comprising an add path for adding an n-channel wavelength multiplex onto the network, in which some of the n channels carry signals to be added onto the network, wherein the add path comprises an n-channel signal combiner for combining the n signal channels, an optical amplifier for amplifying the output of the signal combiner, a multichannel wavelength selective filter with variable per channel loss for blocking channels not carrying signals to be added to the network or controlling the amplitude of the added signals, and an add coupler for coupling the add path to the network.

The invention also provides a method of adding an n-channel DWDM signal to an n-channel DWDM network comprising the steps of combining signals from a plurality of signal sources to provide an n-channel add signal output, amplifying the combined output, using a multichannel wavelength selective filter with variable per channel attenuation to selectively block wavelength channels of the combined signal not carrying signals to be added onto the network or to control the amplitude of the added signal, and coupling the n-channel add signal onto the optical network.

In an embodiment of the invention, the wavelength selective filter attenuates channels carrying signals to be added to the network to control their amplitude.

Preferably, the selective band pass filter comprises an n-channel demultiplexer having n outputs, an n channel multiplexer having n inputs and a variable optical attenuator arranged between each of the demultiplexer outputs and multiplexer inputs, wherein the variable attenuator on any given channel is set to block the signal on that channel if no signal on that channel is to be added onto the network.

By demultiplexing the channels of the amplified output of the add signal combiner, a variable optical attenuator can be used on each channel selectively to filter out the contribution of that channel to the broadband noise if that channel does not carry an add signal. This has the advantage that the broadband noise in the add path can be reduced.

Preferably, the add signal sources are run at full power and the respective VOAs are used to control the power of the signals in these channels.

This has the further advantage of further improving the OSNR of the add path signal.

Embodiments of the invention will now be described, by way of example only, and with reference to the accompanying drawings, in which.

Figure 2:
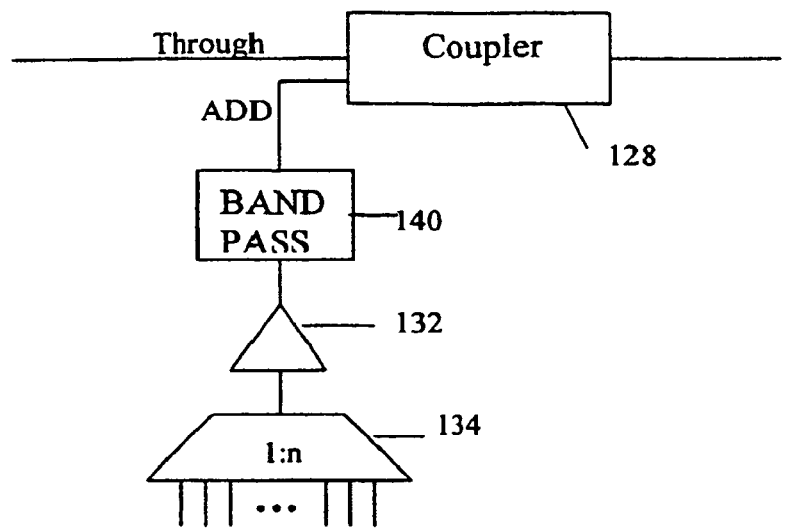
FIG. 2 is a view of a portion of the node of FIG. 1 modified to embody the invention.

The add path shown in FIG. 2 comprises a 32:1 combiner 134 which combines the 32 signal channels to produce a single output signal which is amplified by amplifier 132 and then passed to a WDM multiplexer/demultiplexer device 140. This device is illustrated in more detail in FIG. 3. The output of the device 140 forms the add input to add coupler 128 on one of the E/W and W/E paths of the network.

Figure 3:
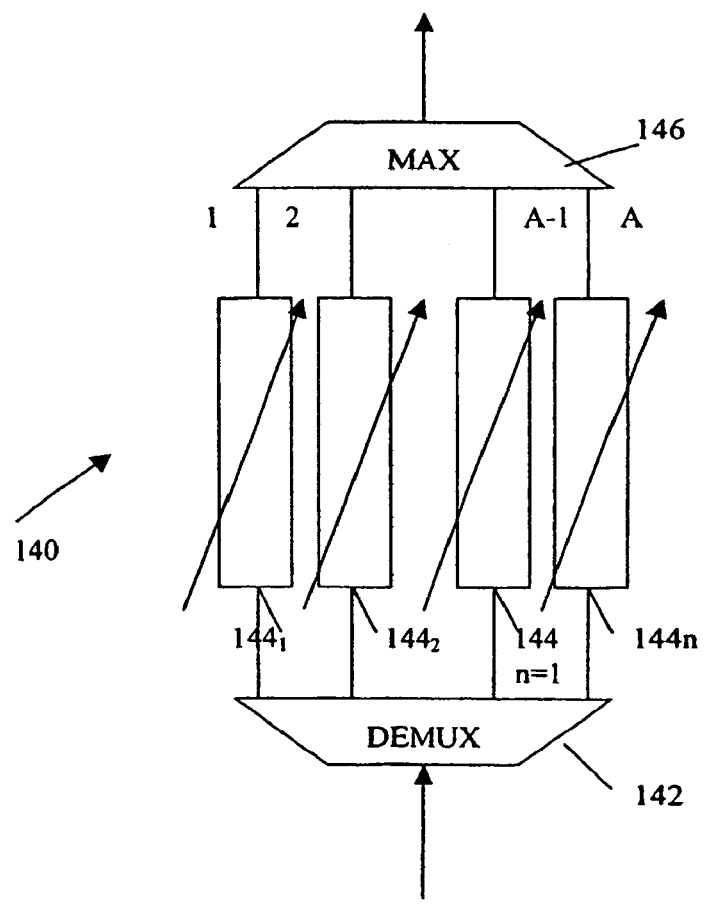
FIG. 3 is a more detailed view of the multiplexer/demultiplexer arrangement of FIG. 2.

FIG. 3 shows the mux/demux device 140 in more detail. The device comprises an optical demultiplexer 142 which receives the multiple wavelength input signal and splits it into n single wavelength outputs. In this example, n=32 and is the number of channels supported by the network. Each of the 1 to n outputs of the demultiplexer 142 is passed through an individual variable optical attenuator (VOA) 144(1) . . . 144(n). The outputs of the 32 variable optical attenuators form the 1 to 32 inputs to an optical multiplexer 146 which remultiplexes the 32 signal paths to output a DWDM multiplex to be added back onto the network by one of the add couplers 28.

Thus, the device 140 is a 2 port device which provides filtering around the channels but which also can adjust the through loss on a channel to channel basis.

Variable optical attenuators (VOAs) are well known and commonly used in optical networks. They can be used to match optical power levels and equalise the power between different DWDM channels, as well as for other applications. VOAs are used to equalise power levels in the output of multiplexers. In the embodiment of FIG. 3, the multiplexer demultiplier and VOA array is used to block noise on channels that are not being added or used to control the added channels. The optical sources being added are run at maximum power and their output amplitude controlled by the respective VOA 144 assigned to that channel. The worst case occurs when the add path losses are at a maximum which equates to the best OSNR achieved before use of the VOAs. As the add path losses fall, the device 140 introduces more attenuation to control the signal amplitude reaching the output. Thus the signal amplitude remains the same but the EDFA noise experiences greater attenuation improves the OSNR of the added signal.

Figure 1:
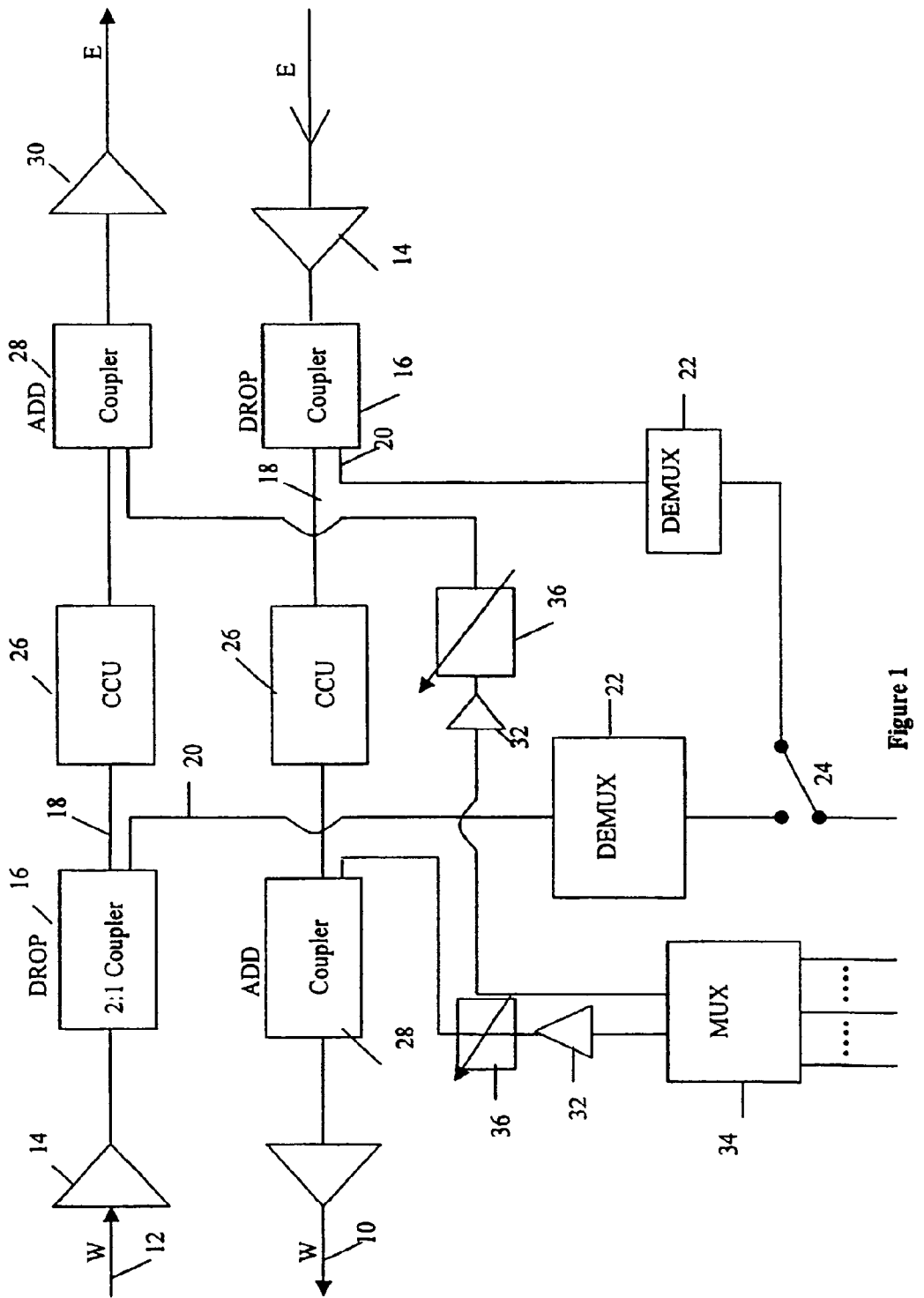
FIG. 1 is a schematic diagram of a known add/drop node on an optical network described previously.
Figure 4:
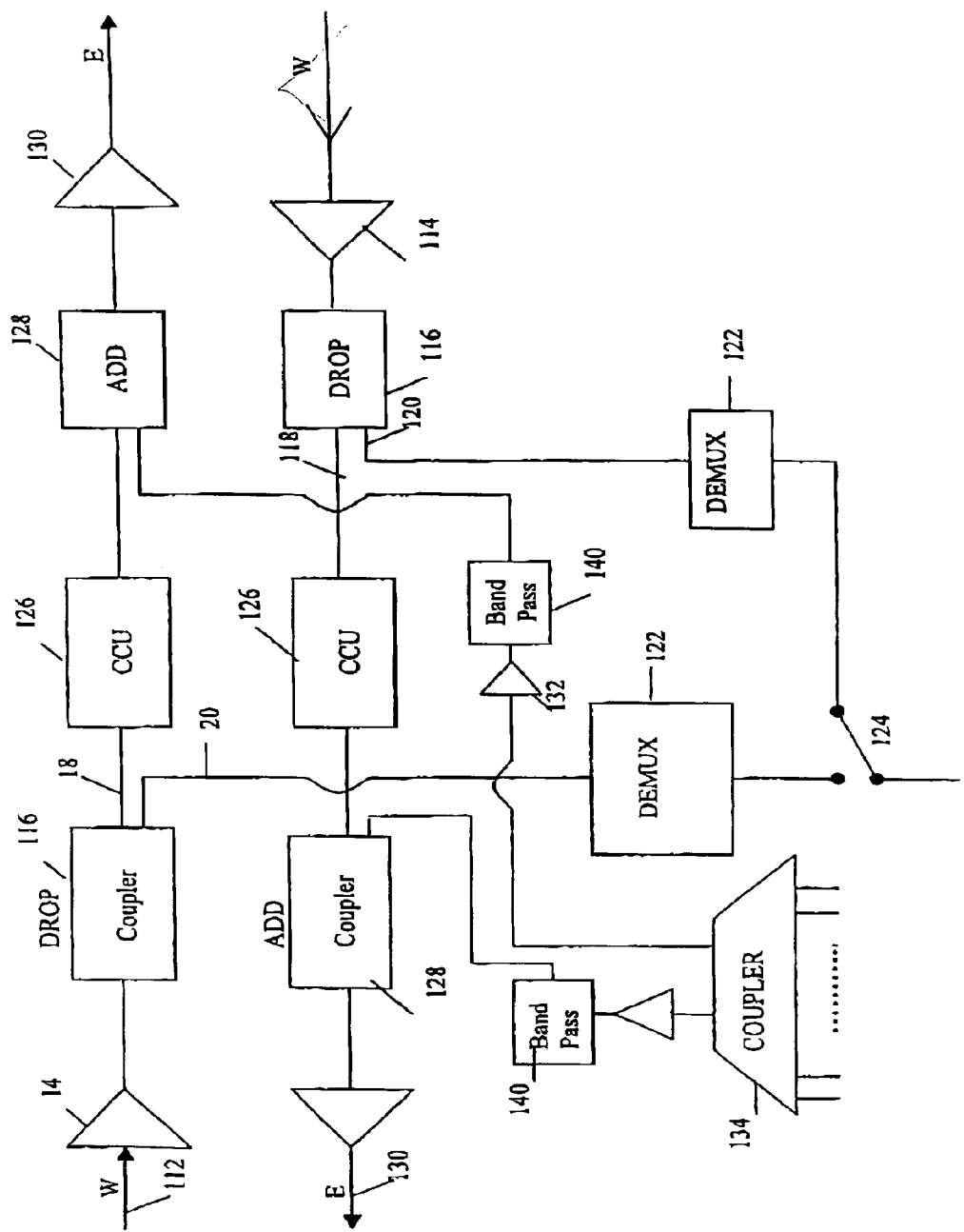
FIG. 4 is a view, similar to FIG. 1 of an add/drop node embodying the invention.

FIG. 4 shows how the device of FIGS. 2 and 3 can be incorporated into the add drop node of FIG. 1. It will be appreciated that a mux/demux device 140 is inserted into the add path of each of the add paths to the E/W and W/E fibre paths. In FIG. 4, the references of FIG. 1 are incremented by 100 and the components are otherwise unchanged.

Various modifications to the embodiment described are possible and will occur to those skilled in the art. The invention is not confined to any particular optical network type and may be used on ring or line networks with or without network amplification. Various devices are suitable for use as the optical multiplexer and demultiplexer and variable optical attenuators. The invention is limited only by the scope of the following claims.

The invention claimed is:

1. An optical network node for an n-channel dense wavelength division multiplexing (DWDM) optical communications network, the node comprising:
    an add path for adding an n-channel wavelength multiplex onto the network, the add path including an n-channel signal combiner for combining the n signal channels,
    an optical amplifier for amplifying an output of the signal combiner,
    a multichannel wavelength selective filter with variable-per-channel attenuation for filtering out noise from the amplifier on a channel to be added to the network by blocking signal on said channel if said channel carries no content to be added to the network, and for controlling amplitude of signals in channels to be added to the network, and
    an add coupler for coupling the add path to the network.

2. The optical network node according to claim 1, the node being adapted to receive optical signals from sources for generating the n-channel signals running at maximum power.

3. The optical network node according to claim 1, wherein the multichannel wavelength selective filter with variable-per-channel attenuation is adapted to filter around the channels.

4. A dense wavelength division multiplexing (DWDM) optical communications network having a plurality of nodes, each node comprising:
    an add path for adding an n-channel wavelength multiplex onto the network, the add path including an n-channel signal combiner for combining the n signal channels,
    an optical amplifier for amplifying an output of the signal combiner,
    a multichannel wavelength selective filter with variable-per-channel attenuation for filtering out noise from the amplifier on a channel to be added to the network by blocking signal on said channel if said channel carries no content to be added to the network, and for controlling amplitude of signals in channels to be added to the network, and
    an add coupler for coupling the add path to the network.

5. The optical communications network according to claim 4, wherein each node is adapted to receive on the add path optical signals from sources for generating the n-channel signals running at maximum power.

6. The optical communications network according to claim 4, wherein the multichannel wavelength selective filter with variable-per-channel attenuation is adapted to filter around the channels.

7. A method of adding an n-channel dense wavelength division multiplexing (DWDM) signal to an n-channel DWDM optical network, the method comprising the steps of:
    combining signals from a plurality of signal sources to provide an n-channel add signal combined output signal;
    amplifying the combined output signal;
    using a multichannel wavelength selective filter with variable-per-channel attenuation to filter out noise from the amplifying step on a channel to be added to the network by blocking signal on said channel if said channel carries no content to be added to the optical network, and to control amplitude of signals in channels to be added to the optical network; and
    coupling the n-channel add signal onto the optical network.

8. The method according to claim 7, further comprising receiving optical signals from the sources running at maximum power to optimize an optical signal-to-noise ratio of the signals added to the optical network.

9. The method according to claim 7, further comprising demultiplexing the n-channel add signal using an n-channel demultiplexer, passing each output channel of the demultiplexer through a variable optical attenuator (VOA), and multiplexing VOA outputs to form the network add signal.

10. The method according to claim 9, wherein the channel which carries no content to be added is blocked by attenuating outputs from the demultiplexer corresponding to this channel to zero.

* * * * *